(12) United States Patent
Rotem et al.

(10) Patent No.: US 8,874,947 B2
(45) Date of Patent: *Oct. 28, 2014

(54) METHOD AND APPARATUS OF POWER MANAGEMENT OF PROCESSOR

(71) Applicant: Intel Corporation, Santa Clara, CA (US)

(72) Inventors: Efraim Rotem, Haifa (IL); Barnes Cooper, Tigard, OR (US); Guy Therien, Beaverton, OR (US); Eliezer Weissmann, Haifa (IL); Anil Aggarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/893,846

(22) Filed: May 14, 2013

(65) Prior Publication Data
US 2014/0040643 A1 Feb. 6, 2014

Related U.S. Application Data

(63) Continuation of application No. 12/342,919, filed on Dec. 23, 2008, now Pat. No. 8,458,498.

(51) Int. Cl.
*G06F 1/26* (2006.01)
*G06F 1/32* (2006.01)

(52) U.S. Cl.
CPC ............ *G06F 1/3206* (2013.01); *G06F 1/3243* (2013.01); *Y02B 60/1239* (2013.01); *G06F 1/3203* (2013.01)
USPC .......................................................... 713/320

(58) Field of Classification Search
CPC ............................... G06F 1/32; G06F 11/3612
USPC ................................................... 713/300, 320
See application file for complete search history.

(56) References Cited

U.S. PATENT DOCUMENTS

| | | | |
|---|---|---|---|
| 6,845,456 B1 * | 1/2005 | Menezes et al. | 713/320 |
| 7,281,041 B2 * | 10/2007 | Daggett | 709/224 |
| 8,543,843 B1 * | 9/2013 | Cheng et al. | 713/300 |
| 2004/0064755 A1 * | 4/2004 | Therien | 714/10 |
| 2006/0069936 A1 * | 3/2006 | Lint et al. | 713/320 |
| 2006/0146056 A1 * | 7/2006 | Wyatt | 345/501 |
| 2007/0021942 A1 * | 1/2007 | Sato et al. | 702/182 |
| 2007/0250219 A1 * | 10/2007 | Gaskins et al. | 700/299 |
| 2009/0187658 A1 * | 7/2009 | Williams et al. | 709/226 |

* cited by examiner

*Primary Examiner* — Mohammed Rehman
(74) *Attorney, Agent, or Firm* — Kacvinsky Daisak Bluni PLLC

(57) ABSTRACT

A processing platform and a method of controlling power consumption of a central processing unit of the processing platform are presented. By operating the method the processing platform is able to set an upper performance state limit and a lower performance state limit. The upper performance state limit is based on a central processing unit activity rate value and the lower performance state limit is based on a minimum require of the operating system to perform operating system tasks. The performance state values are varying within a range of the lower and upper limits according to a power management policy.

17 Claims, 5 Drawing Sheets

US 8,874,947 B2
METHOD AND APPARATUS OF POWER MANAGEMENT OF PROCESSOR

RELATED APPLICATION

This application is related to and claims priority to U.S. application Ser. No. 12/342,919, filed on Dec. 23, 2008 and titled "METHOD AND APPARATUS OF POWER MANAGEMENT OF PROCESSOR"; this application is entirely incorporated by reference.

BACKGROUND OF THE INVENTION

Some computer systems may use adaptive power management policies to manage power and energy consumption. Managing power and energy is done by means of Dynamic Voltage and Frequency Scaling (DVFS). In this example of computer systems, as central processor unit (CPU) utilization decreases, the processor may transition to a lower performance state to conserve power. As the CPU utilization increases, the processor may transition to a higher performance state and may consume more power. An industry standard interface, called Advanced Configuration and Power Interface (ACPI), is defined for the purpose of controlling the frequency/voltage state of the processor.

In ACPI terminology, a frequency/voltage state is called performance state (P-state). Common implementations of P-state control are based on demand. In existing ACPI-based platforms, an operating system (OS) may load a table of performance state (P-state) information. An operating frequency of the processor is represented with corresponding control, status, and latency information. Furthermore, the OS may hold a utilization value for each state for transition to the next P-state up or down. The OS may manage the CPU P-states by directly controlling the calculated P-state at any given time.

For example, a range of predetermined P-states are provided to control the processor power consumption. As the CPU utilization decreases, the processor is transitioned to a lower predetermined P-state to conserve power. As the CPU utilization increases, the processor is transition to a higher predetermined P-state and may consume more power. In existing operating systems, the target P-state selection is based on the combination of processor utilization and the last selected P-state.

However, the OS have more visibility to user preferences, application type (such as real time requirements, visual quality demands, etc.) and does not response fast enough to changes in the workload of the processor caused by the hardware and a micro architecture of the processor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
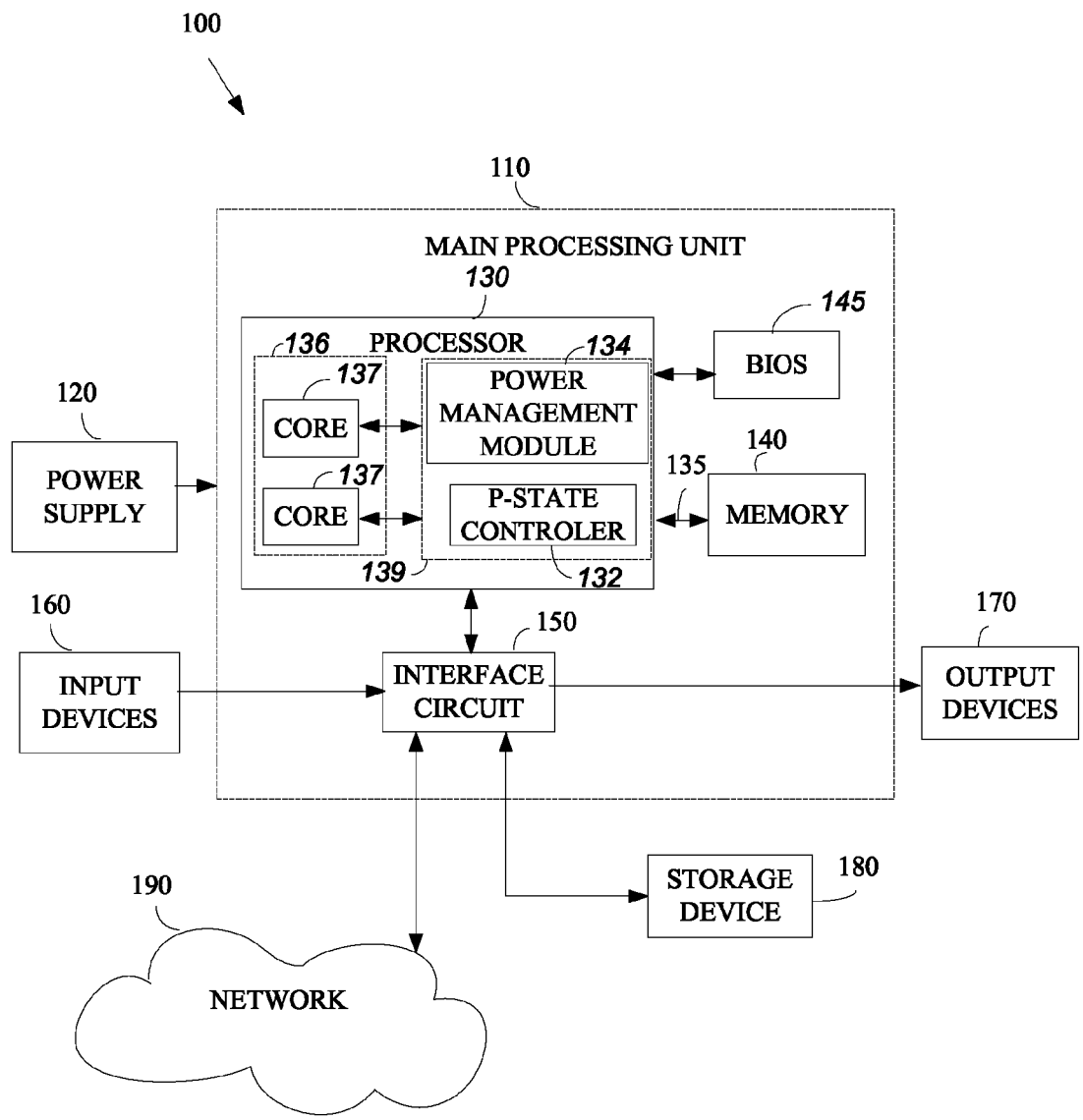
FIG. 1 is a schematic illustration of a block diagram of computer system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or instructions.

It should be understood that the present invention may be used in a variety of applications. Although the present invention is not limited in this respect, the circuits and techniques which may illustrated by block diagrams, flowcharts, timing diagrams, etc., disclosed herein may be used in many apparatuses such as computer systems, processors, CPU or the like. Processors intended to be included within the scope of the present invention include, by way of example only, a reduced instruction set computer (RISC), a processor that have a pipeline, a complex instruction set computer (CISC), a multi core processor, a computer platform and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like.

The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Various embodiments provide techniques that may dynamically adjust processor performance. For example, such techniques may identify processor efficiency and may adjust the processor's performance (e.g., its speed). Such adjustments may involve changing the processor's operational state (e.g., its P-state).

For example, upon detecting that a processor is memory bounded or waiting for another device (such as a graphics card), techniques may adjust the processor's operation so that it runs slower. As a result, energy is conserved. In contrast, upon detecting that the processor is no longer constrained by such limitations, the processor may re-invest the saved energy in providing enhanced performance (e.g. faster operation) by operating at a higher frequency. Such adjustments to processor operation may involve various techniques. Exemplary techniques include toggling the processor's clock signal on and off, and/or changing the processor's operational frequency with or without voltage change.

In embodiments, such techniques may be implemented within the processor. However, in further embodiments, implementations may involve external software and/or external hardware.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Turning to FIG. 1, a block diagram of a computer system 100 according to an exemplary embodiment of the invention is shown. Although the scope of the present invention is not limited in this respect, computer system 100 may be a personal computer (PC), a personal digital assistant (PDA), an Internet appliance, a cellular telephone, a laptop computer, a mobile unit, a wireless communication device and/or any other computing device.

According to exemplary embodiments of the present invention, computer system 100 may include a main processing unit 110 powered by a power supply 120. Main processing unit 110 may include a processing platform 130 electrically coupled by a system interconnect 135 to a memory device 140 and one or more interface circuits 150. For example, the system interconnect 135 may be an address/data bus, if desired. It should be understood that interconnects other than busses may be used to connect processor 130 to memory device 140. For example, one or more dedicated lines and/or a crossbar may be used to connect processing platform 130 to memory device 140.

Processing platform 130 may include an operating system 139 and a CPU 136 which includes one or more cores 137. Operating system 139 may execute a power management module 134, if desired. In addition, processing platform 130 may include a cache memory (not shown), such as, for example, static random access memory (SRAM) and the like, or any other type of internal integrated memory. Memory device 140 may include a dynamic random access memory (DRAM), a non-volatile memory, or the like. In one example, memory device 140 may store a software program which may be executed by processing platform 130, if desired.

Although the scope of the present invention is not limited in this respect, interface circuit(s) 150 may include an Ethernet interface and/or a Universal Serial Bus (USB) interface, and/or the like. In some exemplary embodiments of the invention, one or more input devices 160 may be connected to interface circuits 150 for entering data and commands into the main processing unit 110. For example, input devices 160 may include a keyboard, mouse, touch screen, track pad, track ball, isopoint, a voice recognition system, and/or the like. The output devices 170 may be operably coupled to main processing unit 110 via one or more of the interface circuits 150 and may include one or more displays, printers, speakers, and/or other output devices, if desired. For example, one of the output devices may be a display. The display may be a cathode ray tube (CRT), a liquid crystal display (LCD), or any other type of display.

According to some embodiments of the invention, computer system 100 may include one or more storage devices 180. For example, computer system 100 may include one or more hard drives, one or more compact disk (CD) drive, one or more digital versatile disk drives (DVD), and/or other computer media input/output (I/O) devices, if desired.

Furthermore, computer system 100 may exchange data with other devices via a connection to a network 190. The network connection may include any type of network connection, such as an Ethernet connection, a digital subscriber line (DSL), a telephone line, a coaxial cable, etc. Network 190 may be any type of network, such as the Internet, a telephone network, a cable network, a wireless network such as, for example, a network complying IEEE standard 802.11, 1999 include one or more IEEE 802.11 related standards, IEEE 802.16 Standard for Wireless Metropolitan Area Networks and/or the like.

According to one exemplary embodiment of the invention, processing platform 130 may operate in a variable range of operating frequencies. It should be understood the variable range may include two or more operating frequencies. A selection of the operating frequency of processing platform 130 may be done by a power management module 134 based on processing platform 130 load observed over a window of time, if desired. P-state controller 132 may provide a target P-state to power management module 134. Power management module 134 may set a power consumption target point and may modify the processing platform operating frequency and/or voltage according to the selected entry in the target P-state.

In some embodiment of the invention, P-state values may be provided by a basic input output system (BIOS) 145, if desired. Power management module 134 may accurately select the appropriate P-state to meet computer system 100 performance needs. It should be understood that P-state controller 132 and/or power management module 134 may be implemented by hardware, by software, and/or by any combination of hardware and/or software.

According to embodiments of the invention, a power management module 134 may control a power consumption of two or more cores 137 by determine a range of P-state values. For example, in order to set the range, power management module 134 may set an upper P-state limit and a lower P-state limit. For example, the upper P-state limit may be determined based on a processing platform activity rate value and the lower P-state limit may be determined base on a minimum require of the operating system to perform operating system tasks. P-state controller 132 may vary P-state values within the range of the lower and upper limits according to a power management policy, if desired.

According to exemplary embodiments of the invention, the lower P-state limit may be defined as a minimum required P-state that is needed by the operating system in order to perform its tasks, for example a minimum frequency required to perform some multi media action without visual artifact and/or degraded user experience. According to another example embodiment of the invention, a video decoding may require generating of some predefined frames per seconds. If the CPU performance drops below the performance required for generating the predefined frames and/or generate the next frame of time, the result may be a dropped frame and visual artifact, thus the lower limit of the P-state range may be adjust to meet this requirement, although the scope of the present invention is not limited to this example.

Figure 2:
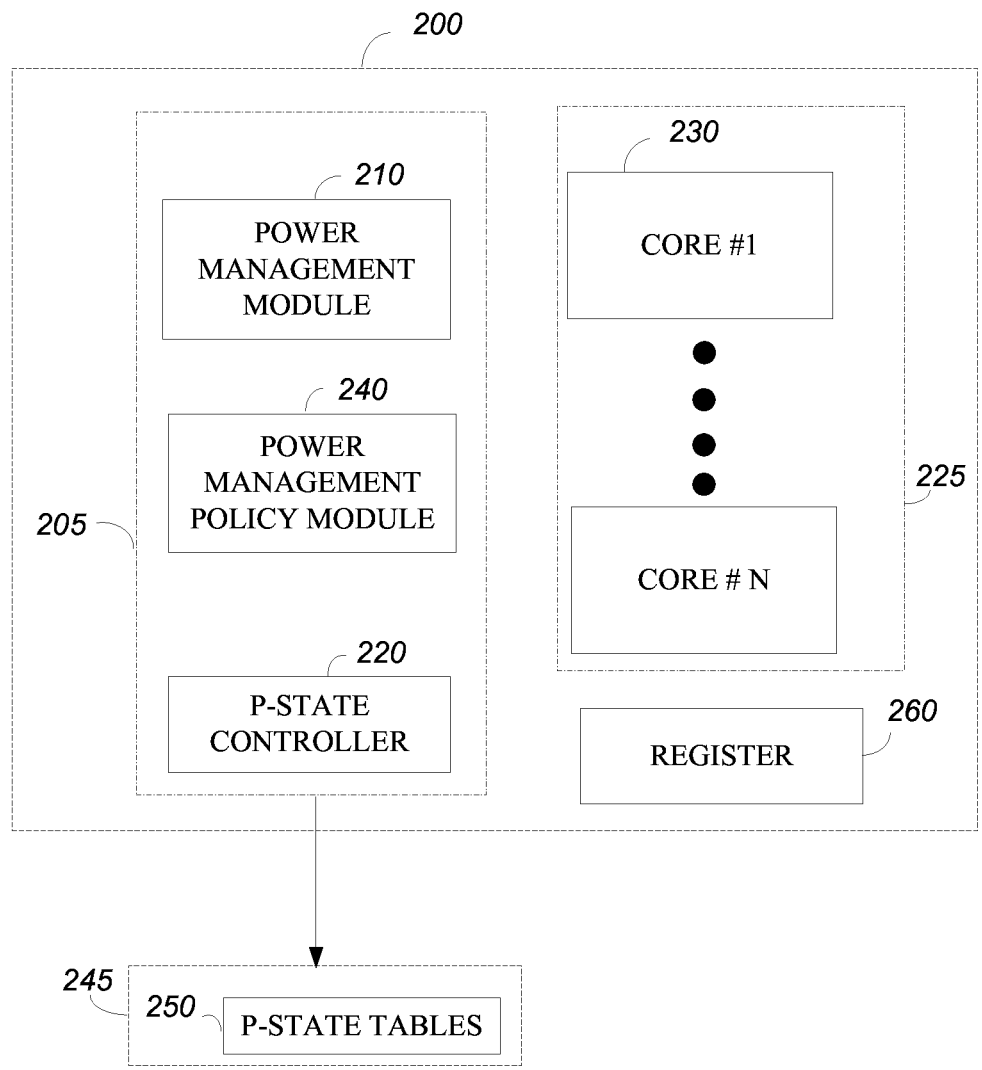
FIG. 2 is a schematic illustration of a block diagram of a portion of a processing platform according to some exemplary embodiments of the invention.

Turning to FIG. 2, a block diagram of a portion of a processing platform 200 according to an exemplary embodiment of the invention is shown. Although the scope of the present invention is not limited in this respect, the portion of processing platform 200 may include an operating system (OS) 205. Operating system 205 may include a power management module 210, a P-state controller 220 and a power management policy module 240. The portion of processing platform 200 may further include a CPU 225 which includes cores 1 . . . N 230, a register 260 which includes a balance parameter, and a BIOS 245 which includes one or more P-state tables 250, although it should be understood that the scope of the present invention is not limited to this exemplary embodiment of the invention.

According to this exemplary embodiment, P-state table may include P-state values and operating frequencies of the CPU 225, if desired. For example, the P-state values may be determined according to the flowing P-states and processor power states (C-states).

P0—may be the P-state which a device or a processor may uses its maximum performance capability and may consume a maximum power.

P1—may be the P-state which the performance capability of the device or the processing platform may be limited below its maximum and may consume less than a maximum power.

Pn—may be one or more P-states which the performance capability of a device or processing platform may be at its minimum level and consumes minimal power while remaining in an active state.

C0—may be the C-state which the processing platform may execute its instructions.

C1—may be the C-state which the processor may has the lowest latency, for example, hardware latency. In this state the latency may be low enough that operating software does not consider the latency aspect of the state when deciding whether to use it or not.

C2—may be the C-state which offers improved power savings over the C1 state. For example, worst-case hardware latency for this state may be provided via the ACPI system firmware and the operating software may use this information to determine when the C1 state should be used instead of the C2 state.

C3—may be the C-state which may offer improved power savings over the C1 and C2 states. The worst-case hardware latency for this state may provided via the ACPI system firmware and the operating software may use this information to determine when the C2 state should be used instead of the C3 state.

According to exemplary embodiments of the invention P-State tables 230 may include the below table e.g., Table 1 for each core 1 . . . N of the processing platform 200.

TABLE 1

| P-state | PSS Frequency | % Max Frequency | Increase Level | Decrease Level |
| --- | --- | --- | --- | --- |
| P0 | 3001 | 100 | 101 | 98 |
| P1 | 3000 | 99 | 98 | 84 |
| P2 | 2666 | 88 | 85 | 73 |
| P3 | 2333 | 77 | 74 | 62 |
| P4 | 2000 | 66 | 63 | 0 |

According to this example, Table 1 may include a plurality of selectable P-states (e.g., P0, P1 . . . . P4). Power management module 210 may use a selected P-state (e.g., P0, P1 . . . P4) to set a desired operating frequency and a desired operating voltage to cores 1 . . . N 230, independently and/or separately.

Although the scope of the present invention is not limited in this respect, power management module 210 and/or P-state controller 220 and/or power management policy module 240 and/or register 260 may be implemented by hardware, software and any desired combination of hardware and software.

According to exemplary embodiment of the invention, power management module 210 may control a power consumption of two or more cores 230 by setting a range of P-states values. For example power management module 210 may set an upper P-state limit of the range, for example P1, and a lower P-state limit of the range, for example P3, wherein the upper P-state limit may be based on a processing platform activity rate value and the lower P-state limit may be base on a minimum require of the operating system to perform operating system tasks. P-state controller 220 may set P-state values for example, values from Table 1, which are within the range set by the lower and upper P-state limits and according to a power management policy which may be set by power management policy module, if desired.

According to this exemplary embodiment of the invention, register 260 may includes a balance parameter (not shown). Power management policy module 240 may upload the balance parameter from the register and vary the P-state value according to the balance parameter. The balance parameter may be used to balance between a desired performance parameter and desired energy efficiency parameters of the CPU 225.

According to embodiments of the invention the balance parameter may indicate to include for example, a value defining desired power policy module 240 to balance between consumption to a desired performance policy and an energy efficient policy, if desired preference. A value of 0, for example may indicate maximum performance while a value of 16 and/or any other value may indicate maximum energy savings. Any intermediate value in between may indicate balancing between the energy and performance. For example, a value of 7 may indicate equal importance to power and performance, although the scope of the present invention is not limited in this respect.

Power management policy module 240 may provide policies according to the processor activity. For example the policy may include:

An energy efficiency policy—this policy may offset towards lower P-states by picking the P-states that will provide best result on total energy consumed to complete a task of the CPU. For example, an energy efficient operation point may be running always at the lowest possible P-state, if desired.

A performance policy—this policy may offset towards higher P-states, maximizing performance while meeting other constraints such as, for example power and/or thermal limits. For example, the highest performance operation point may be running at the highest possible P-state.

A balanced or dynamic policy—this policy may provide weighed mixture of both energy efficiency and performance. For example, this policy may pick an intermediate P-state between maximum and minimum P-state. This value may be fixed or variable over time between maximum and minimum values, if desired.

According to some embodiments of the invention, management policy module 240 may monitor an energy consumption of the CPU (e.g., CPU 225), may calculate an energy efficiency value and may vary the P-state value according to a desired energy efficiency value. For example, management policy module 240 may determine a desired performance parameter of the CPU and may vary the P-state value according to the desired performance parameter of the CPU, although the scope of the present invention is not limited in this respect.

Furthermore, power management module 210 may set upper and lower thresholds around the upper P-state limit. For example, power management module 210 may monitor the CPU activity over a predetermined time interval. Furthermore, power management module 210 may calculate the processor activity rate value and may compare said upper threshold and lower threshold to the CPU activity rate. For example, power management module 210 may increase said upper P-state limit if the CPU activity rate is above the upper threshold and may decrease said upper P-state limit if the CPU activity rate is below the lower threshold. According to some embodiments of the invention, a similar procedure may be provided with regard to modifying the lower P-state limit of the P-state range.

Figure 3:
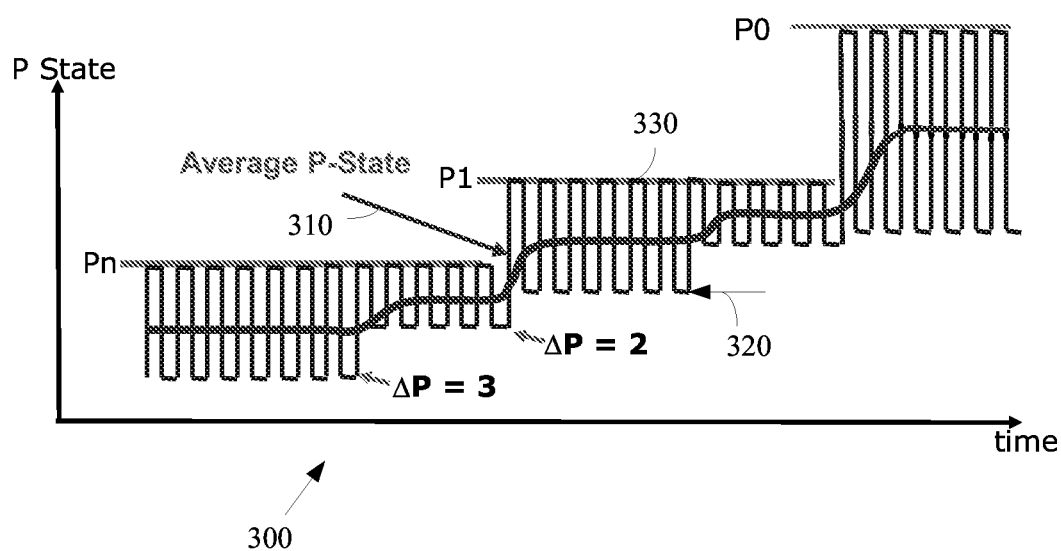
FIG. 3 is an illustration of a time diagram showing changes in P-state values over time, according to some exemplary embodiments of the invention.

Turning to FIG. 3 an illustration of a time diagram showing changes in P-state values over time, according to some exemplary embodiments of the invention is shown. Although the scope of the present invention is not limited to this example, a timing diagram 300 shows three P-states e.g., P0, P1 and Pn. According to this example, Pn may include P-states P3 and P4. Time diagram 300 may further include an average P-state 310, an upper limit 330 and a lower limit 320. Upper limit 330 and lower limit 320 may be set by power management module 210 and the P-state may vary within the range of upper and lower limits 320 and 330, if desired. Average P-state 310 is a calculate value of the average P-state over time.

According to this example, upper and lower limit 320 and 330 may be set around average P-state 310, if desired. CPU 225 may change is active state (e.g., P-state and/or C-state) within the range of the lower and upper limits 320 and 330, if desired.

According to some exemplary embodiments of the invention, upper limit 330 may be defined as a P-state value that the CPU is not allowed to go above and lower limit 320 may be defined as the minimum required P-state that is needed by the operating system (e.g., operating system 205) in order to perform its tasks. For example, such criteria may be a minimum frequency required to perform some multi media actions without visual artifact or degraded user experience.

The setting of upper and lower limits 320 and 330 may be done by hardware and/or by software and/or by operating system and/or by a driver and/or by an application, although it should be understood that embodiments of the invention are not limited to these examples. The P-states may be represented as absolute values and/or base and offset values. For example, the values of the upper and lower limits may be set by the operating system, and/or by a control algorithm that may vary P-state in a closed loop feedback. In some embodiments, an actual P-state within the range between the two limits may be managed by hardware of the CPU, if desired.

According to one exemplary embodiment of the invention, upper limit 330 of P-state range may be set according the follows example algorithm. One such existing algorithm may use an idle time percentage. If an idle time of the CPU increases above an upper threshold the P-state request is decreased and if the idle time exceeds a lower threshold, the P-state is increased. For example, an idle Time–Ti in percentage (%) may be calculated as Ti=((Time in C0)/(Time in C1 and below))*100%, where C0 is an active operating state of the CPU and C1 is the state that the CPU is inactive e.g., sleeping mode. According to one exemplary embodiment of the invention, if the CPU is running at P-state P3 and the thresholds may be set to 60% (the lower threshold) and 80% (the upper threshold) then:

```
If Ti<80%      // the current P-state is below the upper threshold
P←P2           // P- state P is increased to the flowing P-state level e.g.,
               P2
Else if Ti>60% // the current P-state is above the lower threshold
P←P4           // P- state P is decreased to the preceding P-state
               level e.g., P2
Else
  P dose not change and remains P3
End if
```

According to some exemplary embodiments of the invention, the lower limit of P-state range may be set by a closed loop algorithm and/or a heuristics. An example for such algorithm may be:

```
Let's define:
Pe = effective P-State e.g. the weighted average over time of the
different P-states the CPU was executing; and
T'i = Ti*(Lower limit/Pe). T'i represents the expected idle time if the
CPU was executing at the lower allowed P-state.
If T'i<80%      // the current P-state is below the upper threshold
```

-continued

| | |
|---|---|
| P←P2 | // P- state P is increased to the flowing P-state level e.g., P2 |
| Else if T'i>60% | // the current P-state is above the lower threshold |
| P←P4 | // P- state P is decreased to the preceding P-state level e.g., P2 |
| Else | |
| | P dose not change and remains P3 |
| End if | |

Although the scope of the present invention is not limited in this respect, it should be understood that other algorithms may be applied as well, for example, it is feasible to dynamically calculate a maximum tolerable performance degradation, which may be used to determine placement of the lower limit.

According to some exemplary embodiment, controlling the P-states within the allowable range may be done by providing a status notification mechanism if the CPU is unable to deliver the required performance level set by the lower limit (e.g., due to a power limit or thermal constraint). Additionally, it should be understood that this interface may collapse to a legacy interface by setting upper and lower limits 320 and 330 to the same value, if desired.

Figure 4:
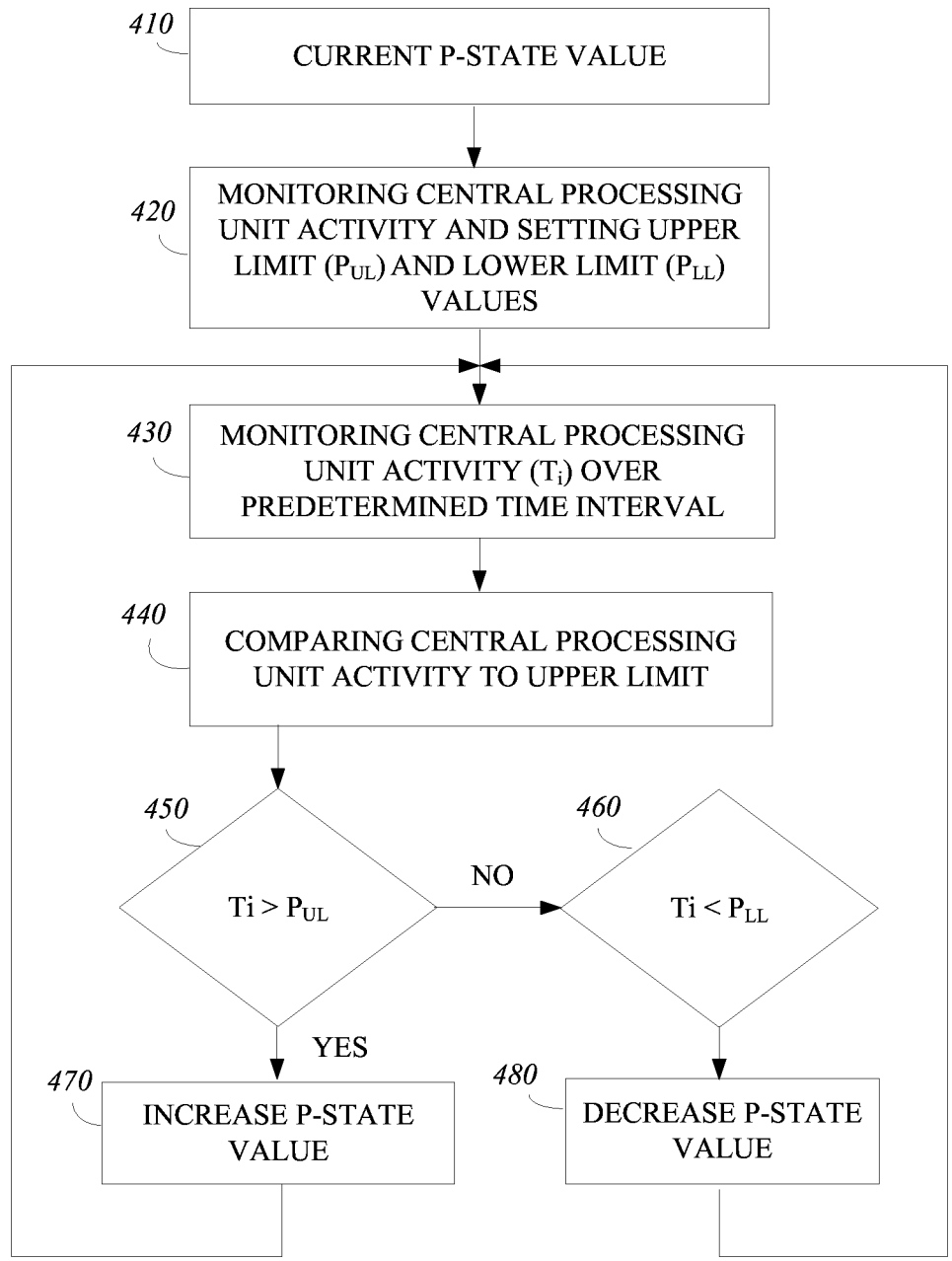
FIG. 4 is an illustration of flowchart of a method of setting an upper P-state value within a range of P-state values, according to some exemplary embodiments of the invention.

Turning to FIG. 4, an illustration of flowchart of a method of setting an upper limit of a range of P-state values, according to some exemplary embodiments is shown. According to this example, the method starts with a current P-state value (text block 410) which is the actual upper P-state limit. The upper P-state limit may be set within a range of first and second thresholds. Setting the first threshold (e.g., upper limit ($P_{UL}$) and the second threshold (e.g., lower limit $P_{LL}$) may be related to the processor activity (text box 420). Power management module 210 may monitor the CPU activity ($T_i$) over a predetermined time interval (text box 430) and may compare the CPU activity to the first threshold e.g., upper limit (text box 440). If the CPU activity ($T_i$) is lower then the second threshold e.g., $P_{LL}$ (diamond 460) than the P-stat upper limit may be decreased (text box 480). If the CPU activity ($T_i$) is greater then the first threshold e.g., $P_{UL}$ (diamond 450) than the P-stat upper limit may be increased (text box 470). This exemplary algorithm may run in close loop in order to vary the upper P-state according to the activity of the CPU, if desired.

Figure 5:
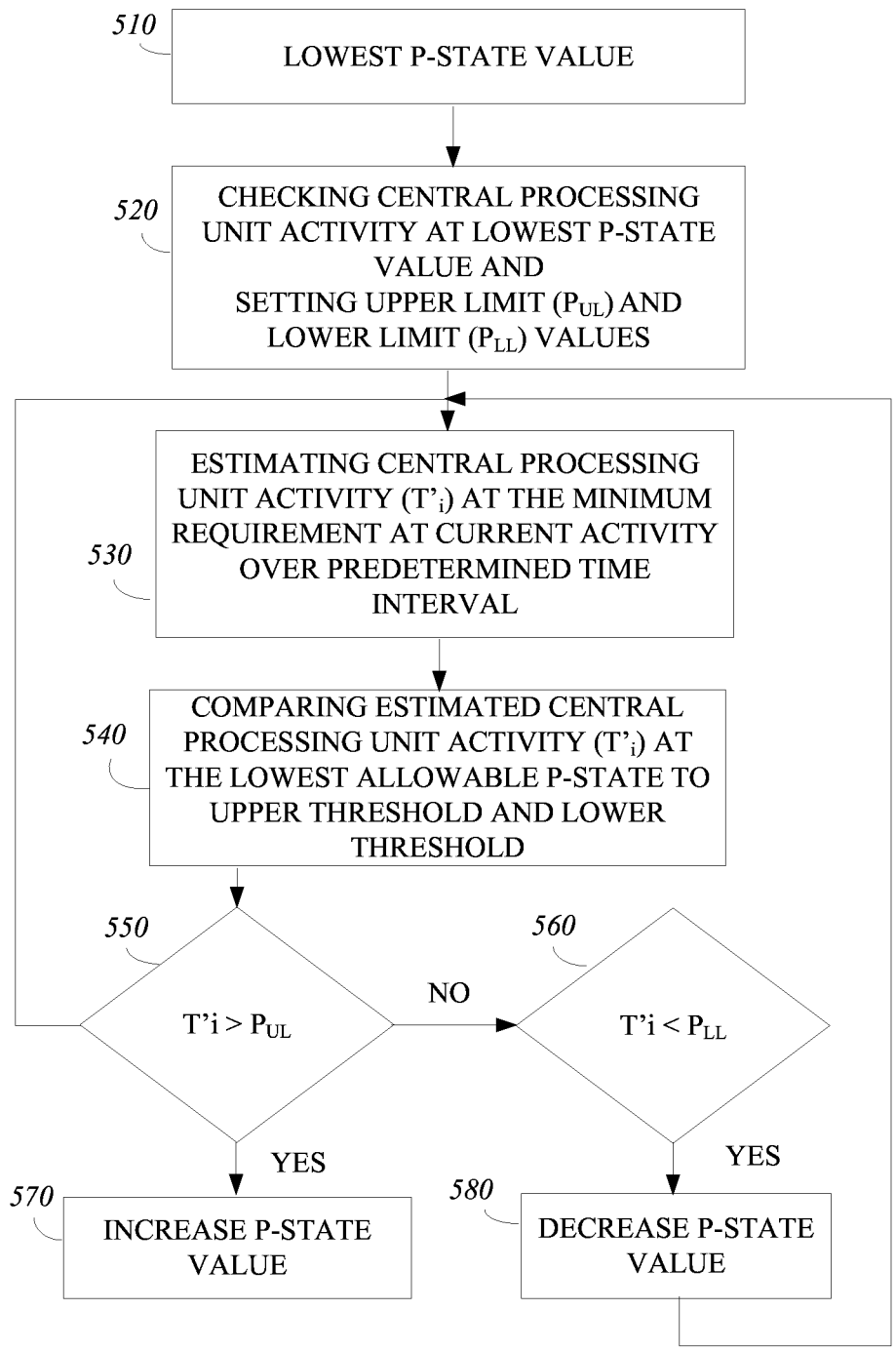
FIG. 5 is an illustration of a flowchart of a method of setting a lower P-state value within a range of P-state values, according to some exemplary embodiments.

Turning to FIG. 5 an illustration of flowchart of a method of setting a lower limit of a range of P-states, according to some exemplary embodiments is shown. According to this example, the method starts with a current lowest P-state value of the P-states range (text block 510) which is the actual lower limit of the p-state range. The lower limit may be set within a range of first and second thresholds. Setting the first threshold (e.g., upper limit ($P_{UL}$) and the second threshold (e.g., lower limit $P_{LL}$) may be related to the CPU activity at the lowest P-state value (text box 520). Power management module 210 may estimate the CPU activity ($T'_i$) at a minimum power consumption requirement at current activity of the CPU over a predetermined time interval (text box 530) and may compare the estimated CPU activity ($T'_i$) to the first threshold and second thresholds (text box 540). If the CPU activity ($T'_i$) is lower then the second threshold e.g., $P_{LL}$ (diamond 560) than the lower P-stat limit of the P-state range may be decreased (text box 580). If the CPU activity ($T'_i$) is greater then the first threshold e.g., $P_{UL}$ (diamond 550) than the lower P-stat limit of the P-states range may be increased (text box 570). This exemplary algorithm may run in close loop in order to vary the lowest P-state limit according to the activity of the CPU at the lowest allowable P-state limit of the P-states range, if desired.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It may be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   setting an upper performance state limit and a lower performance state limit, the upper performance state limit based on a processor activity rate value and the lower performance state limit based on a minimum requirement of an operating system to perform tasks;
   adjusting the upper performance state limit when the processor activity rate value is above an upper threshold value for the upper performance state limit or below a lower threshold value for the upper performance state limit; and
   adjusting the lower performance state limit when the processor activity rate value is above an upper threshold value for the lower performance state limit or below a lower threshold value for the lower performance state limit;

setting a performance state value to the upper performance state limit;

setting the upper performance state limit within the upper and lower threshold values set for the upper performance state limit;

monitoring the processor activity over a predetermined time interval;

calculating the processor activity rate value;

comparing the upper and lower threshold values set for the upper performance state limit to the processor activity rate;

increasing the upper performance state limit when the processor activity rate is above the upper threshold value set for the upper performance state limit; and decreasing the upper performance state limit when the processor activity rate is below the lower threshold value set for the upper performance state limit.

2. The computer-implemented method of claim 1, the upper and lower threshold values for the upper performance state limit are different than the upper and lower threshold values for the lower performance state limit.

3. The computer-implemented method of 1, the adjusting the lower performance state limit comprising:

setting a performance state value to the lower performance state limit;

setting the lower performance state limit within the upper and lower threshold values for the lower performance state limit;

estimating the processor activity rate over the lowest performance state value; and comparing the upper and lower threshold values for the lower performance state limit to the estimated processor activity rate.

4. The computer-implemented method of claim 3, comprising:

increasing the lower performance state limit when the processor activity rate is above the upper threshold value for the lower performance state limit; and decreasing the lower performance state limit when the processor activity rate is below the lower threshold value for the lower performance state limit.

5. The computer-implemented method of claim 1, comprising:

monitoring an energy consumption of a processor;

calculating an energy efficiency value; and varying a performance state value according to a desired energy efficiency value.

6. The computer-implemented method of claim 1, comprising:

determining a desired performance parameter of a processor; and varying a performance state value according to the desired performance parameter of the processor.

7. The computer-implemented method of claim 1, comprising:

varying a performance state value within a range defined by the lower performance state limit and the upper performance state limit according to a power management policy; and calculating an average performance state according to the performance state value evaluated over predetermined time interval.

8. The computer-implemented method of claim 1, comprising:

varying a performance state value according to a balance parameter wherein the balance parameter is to balance between a desired performance parameter and a desired energy efficiency parameters of the central processing unit.

9. An apparatus, comprising:

processing circuitry;

a power management module for execution on the processing circuitry to:

control power consumption of the apparatus by setting an upper performance state limit and a lower performance state limit, the upper performance state limit is based on processor component activity rate value and the lower performance state limit is based on a minimum requirement of an operating system to perform tasks, adjust the upper performance state limit when the processor component activity rate value is above an upper threshold value for the upper performance state limit or below a lower threshold value for the upper performance state limit, and adjust the lower performance state limit when the central processing unit activity rate value is above an upper threshold value for the lower performance state limit or below a lower threshold value for the lower performance state limit;

set a performance state value to the lower performance state limit, set the upper and lower threshold values for the lower performance state limit around the upper performance state limit, estimate the processor component activity rate over a lowest performance state value, compare the upper and lower threshold values for the lower performance state limit to the estimated processor component activity rate;

increase the lower performance state limit when the processor component activity rate is above the upper threshold value for the lower performance state limit, and decrease the lower performance state limit when the processor component activity rate is below the lower threshold value for the lower performance state limit.

10. The apparatus of claim 9, the power management module to:

set a performance state value to the upper performance state limit, set the upper and lower threshold values for the upper performance state limit around the upper performance state limit, monitor processor component activity over a predetermined time interval, calculate the processor component activity rate value, and compare the upper and lower threshold values for the upper performance state limit to the processor component activity rate.

11. The apparatus of claim 10, the power management module to:

increase the upper performance state limit when the processor component activity rate is above the upper threshold value for the upper performance state limit, and decrease the upper performance state limit when the processor component activity rate is below the lower threshold value for the upper performance state limit.

12. The apparatus of claim 9, comprising a management policy module for execution on the processing circuitry to:

monitor an energy consumption of a processor component, calculate an energy efficiency value, and
vary a performance state value according to a desired energy efficiency value.
13. The apparatus of claim 9, comprising a management policy module for execution on the processing circuitry to:
determine a desired performance parameter of a processor component, and
vary a performance state value according to the desired performance parameter of the processor component.
14. The apparatus of claim 9, comprising:
a register coupled with the processing circuitry, the register having a balance parameter; and
a power management policy module for execution on the processing circuitry to vary a performance state value according to the balance parameter which is balanced between a desired performance parameter and a desired energy efficiency parameter of the processor component.
15. A computer system comprising:
a liquid crystal display coupled with a processing platform, the processing platform comprising a power management module to:
control a power consumption by setting an upper performance state limit and a lower performance state limit, wherein the upper performance state limit is based on a processing platform activity rate value and the lower performance state limit is based on a minimum requirement of the operating system to perform tasks,
adjust the upper performance state limit when the processing platform activity rate value is above an upper threshold value for the upper performance state limit or below a lower threshold value for the upper performance state limit,
adjust the lower performance state limit when the platform processing activity rate value is above an upper threshold value for the lower performance state limit or below a lower threshold value for the lower performance state limit, and the power management module to:
set a performance state value to the upper performance state limit,
set the upper and lower threshold values for the upper performance state limit around the upper performance state limit,
monitor processing platform activity over a predetermined time interval,
calculate the processing platform activity rate value,
compare the upper and lower threshold values for the upper performance state limit to the processing platform activity rate;
increase the upper performance state limit when the processing platform activity rate is above the upper threshold value for the upper performance state limit, and
decrease the upper performance state limit when the processing platform activity rate is below the lower threshold value for the upper performance state limit: or
set a performance state value to the lower performance state limit,
set the upper and lower threshold values for the lower performance state limit around the lower performance state limit,
estimate the processing platform activity rate over a lowest performance state value, and
compare the upper and lower threshold values for the lower performance state limit to the estimated processing platform activity rate;
increase the lower performance state limit when the processing platform activity rate is above the upper threshold value for the lower performance state limit, and
decrease the lower performance state limit when the processing platform activity rate is below the lower threshold value for the lower performance state limit.
16. The computer system of claim 15, the processing platform comprising a management policy module to:
monitor an energy consumption of a processing platform,
calculate an energy efficiency value, and
vary a performance state value according to a desired energy efficiency value.
17. The computer system of claim 15, the processing platform comprising:
a register including a balance parameter; and
a power management policy module to vary the performance state value according to the balance parameter that balanced between a desired performance parameter and a desired energy efficiency parameters of the processing platform.

* * * * *